US010533302B2

(12) United States Patent
Satou

(10) Patent No.: US 10,533,302 B2
(45) Date of Patent: Jan. 14, 2020

(54) CONSTRUCTION MACHINE

(71) Applicant: Hitachi Construction Machinery Co., Ltd., Taito-ku, Tokyo (JP)

(72) Inventor: Kiichi Satou, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 16/082,467

(22) PCT Filed: Jul. 18, 2017

(86) PCT No.: PCT/JP2017/025996
§ 371 (c)(1),
(2) Date: Sep. 5, 2018

(87) PCT Pub. No.: WO2018/055887
PCT Pub. Date: Mar. 29, 2018

(65) Prior Publication Data
US 2019/0085532 A1 Mar. 21, 2019

(30) Foreign Application Priority Data

Sep. 21, 2016 (JP) .................................. 2016-183999

(51) Int. Cl.
*B60R 1/00* (2006.01)
*E02F 9/08* (2006.01)
(52) U.S. Cl.
CPC ............ *E02F 9/0833* (2013.01); *B60R 1/006* (2013.01); *E02F 9/0858* (2013.01)
(58) Field of Classification Search
CPC .. B60R 1/006; B60R 1/10; B60R 1/12; B60R 3/002; B60R 3/005; E02F 9/0833; E02F 9/0858
See application file for complete search history.

(56) References Cited

U.S. PATENT DOCUMENTS

| 2,302,952 | A | * | 11/1942 | Pfeifer | ...................... B60R 1/10 |
| | | | | | 359/862 |
| 2015/0203040 | A1 | * | 7/2015 | MacDougall | ............. B60R 1/08 |
| | | | | | 359/863 |

(Continued)

FOREIGN PATENT DOCUMENTS

JP  3-24434 U   3/1991
JP  9-242122 A  9/1997
(Continued)

OTHER PUBLICATIONS

Notification of Transmittal of Translation of the International Preliminary Report on Patentability (PCT/IB/338 & PCT/IB/373) issued in PCT Application No. PCT/JP2017/025996 dated Apr. 4, 2019, including English translation of document C2 (Japanese-language Written Opinion (PCT/ISA/237) previously filed on Sep. 5, 2018) (six (6) pages).

(Continued)

*Primary Examiner* — Gregory A Blankenship
(74) *Attorney, Agent, or Firm* — Crowell & Moring LLP

(57) ABSTRACT

A construction machine includes a machine body, a walkway 30 formed on an upper surface of a lateral one side of the machine body, and a handrail 36 configured to be height-variable by a fixed rail body 50 provided standing along the walkway 30 on the lateral one side on the upper surface of the machine body and a movable rail body 70 attached rotatably to an upper end portion of the fixed rail body 50 and foldable with respect to the fixed rail body 50. The fixed rail body 50 has a plurality of struts 51 that each having a bent shape such that an upper portion is located more laterally outward than a lower portion. A mirror 45 is attached to the strut 51. The mirror 45 is disposed laterally outward than the lower portion of the strut 51 and within a width of the machine body, and is disposed between the struts 51, below an upper end portion of the fixed rail body (Continued)

50, and above a rotation tip portion of the movable rail body 70 after folded. In such a configuration, attaching the mirror to the foldable handrail to secure a lateral visibility neither result in interfering with folding of the handrail nor result in constituting obstacles to transporting, to the walkway, and to a cover opened/closed at maintenance.

5 Claims, 7 Drawing Sheets

(56) References Cited

U.S. PATENT DOCUMENTS

| | | | | |
|---|---|---|---|---|
| 2016/0002884 | A1* | 1/2016 | Nakamura | B60R 3/00 296/190.04 |
| 2018/0105116 | A1* | 4/2018 | Neisen | B60R 3/02 |
| 2019/0085532 | A1* | 3/2019 | Satou | E02F 9/0858 |

FOREIGN PATENT DOCUMENTS

| | | | |
|---|---|---|---|
| JP | 2000-203789 A | 7/2000 | |
| JP | 2003-95580 A | 4/2003 | |
| JP | 2006-290030 | * 10/2006 | ............... E05F 9/00 |
| JP | 2011-149176 A | 8/2011 | |

OTHER PUBLICATIONS

Notification Concerning Documents Transmitted (PCT/IB/310) issued in PCT Application No. PCT/JP2017/025996 dated Dec. 5, 2018, including English translation of document C2 (Japanese-language Written Opinion (PCT/ISA/237) previously filed on Sep. 5, 2018) (six (6) pages).

International Search Report (PCT/ISA/210) issued in PCT Application No. PCT/JP2017/025996 dated Oct. 17, 2017 with English translation (five (5) pages).

Japanese-language Written Opinion (PCT/ISA/237) issued in PCT Application No. PCT/JP2017/025996 dated Oct. 17, 2017 (three (3) pages).

* cited by examiner

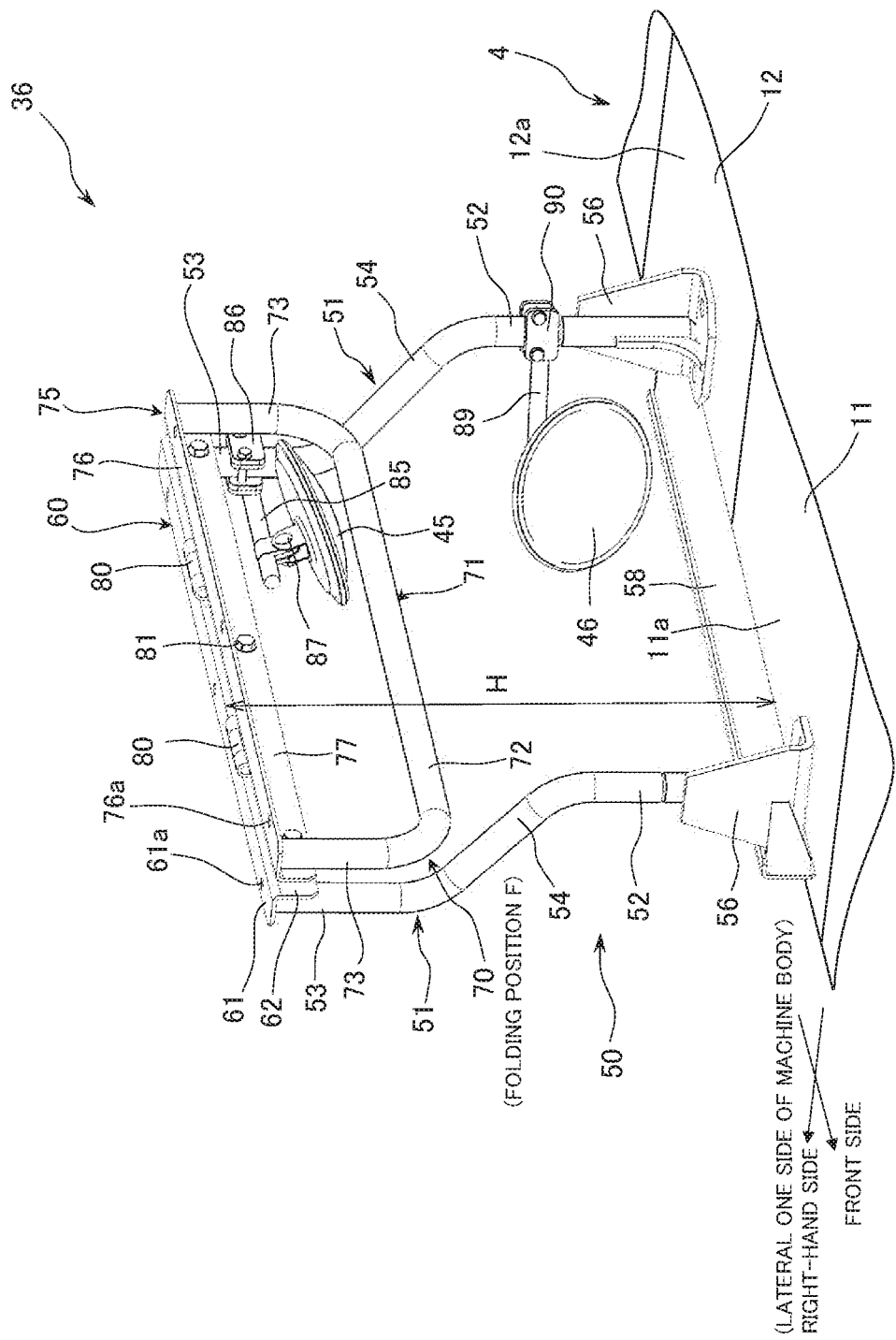

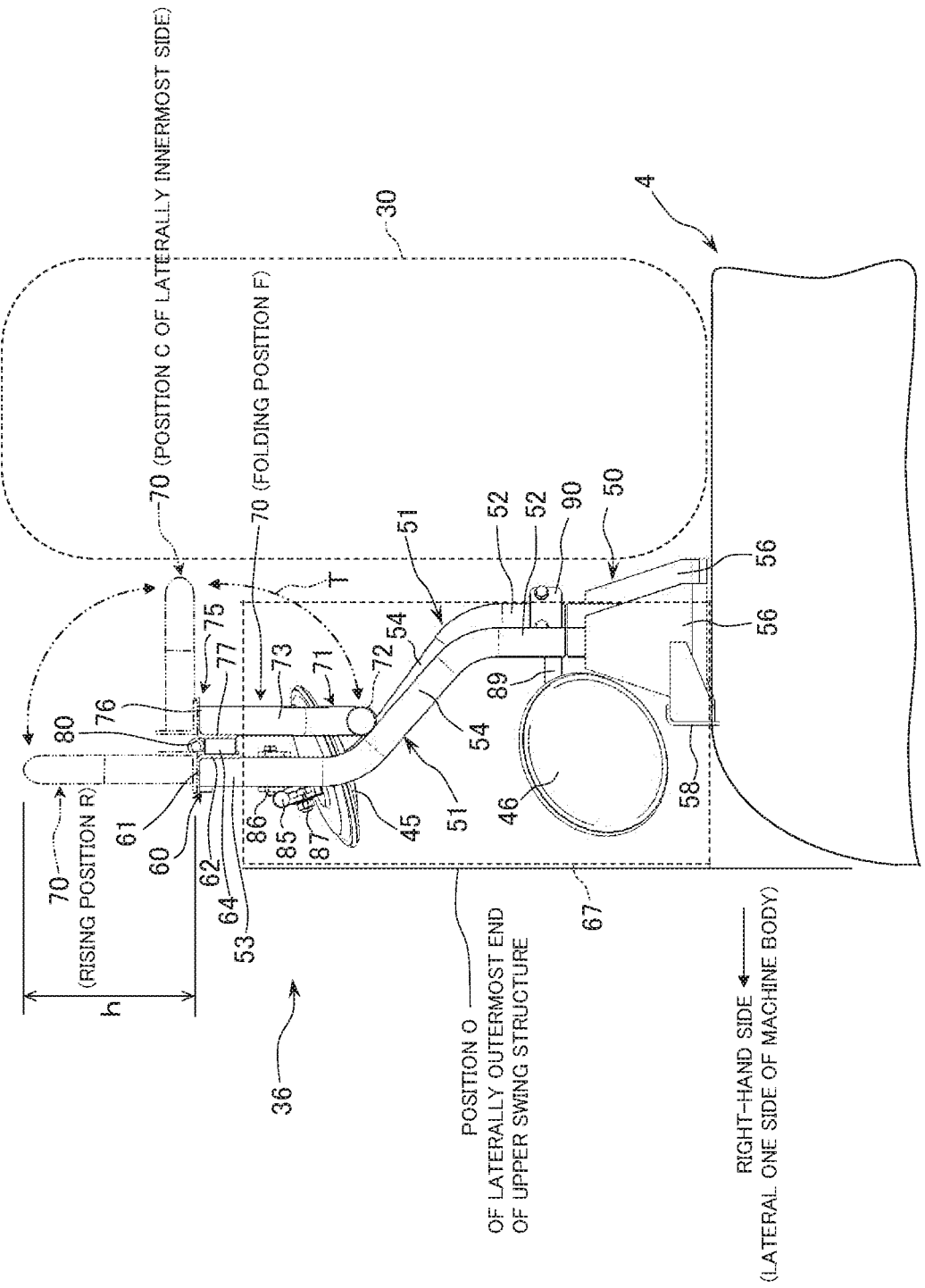

CONSTRUCTION MACHINE

TECHNICAL FIELD

The present invention relates to a construction machine and more specifically relates to a construction machine having a handrail provided on a machine body.

BACKGROUND ART

A construction machine such as a hydraulic excavator or a wheel loader is equipped with various devices such as a fuel tank, a hydraulic fluid tank, and an engine. When conducting various maintenance work such as replenishment of fuel and hydraulic fluid and adjustment of the various devices, a worker often climbs up onto a high position of a machine body. Owing to this, a walkway for the worker to conduct the maintenance work is secured on an upper surface of the machine body or the like.

A handrail (hand rail) is provided along the walkway for assisting the worker in getting onto and off and walking. For the improvement in safety at the maintenance work and the prevention of falling from the high position during walking, setting a height of the handrail to a predetermined value or more from an installation surface to use the handrail as a safety fence has been advocated. In a case of installing the handrail (safety fence) of the height equal to or larger than the predetermined value on the upper surface of the machine body, the high handrail possibly constitutes an obstacle to transporting the construction machine by a truck or the like. To address the problem, there is proposed a handrail (fence) in which the height of the handrail can be changed by rotating and folding part of the handrail at a halfway in a height direction of the handrail (refer to, for example, Patent Document 1).

PRIOR ART DOCUMENT

Patent Document
Patent Document 1: JP-2011-149176-A

SUMMARY OF THE INVENTION

Problem to be Solved by the Invention

Meanwhile, a cab seat in which an operator is seated is often provided on a lateral one side of the machine body (one side in a width direction) in the construction machine. In such a construction machine, a mirror is attached on the lateral other side of the machine body to secure a visibility of an opposite side of the machine body as seen from the operator. In a case of, for example, a hydraulic excavator, a mirror is often attached to or in the vicinity of a handrail, for getting onto and off, installed on a front portion of the machine body on the opposite side to the cab seat. Generally, a front work implement that conducts excavation work is disposed between the cab seat on the one side and the handrail on the other side in the hydraulic excavator. Lowering the front work implement often blocks a sight line of the operator to the mirror. There is a demand to secure a lateral visibility on the other side of the machine body regardless of any work position of the front work implement.

To meet the demand, attaching another mirror different from the mirror on the front portion side of the machine body to a handrail installed along a walkway on the other side of the upper surface of the machine body is conceivable. In this case, it is necessary to prevent the mirror attached to the handrail from posing an obstacle to transporting of the construction machine, an obstacle to the walkway, and an obstacle to a cover that is opened/closed at maintenance. Furthermore, in a case in which the handrail to which the mirror is attached has a structure foldable by rotating part of the handrail, like the handrail disclosed in Patent Document 1, it is also necessary to prevent the mirror attached to the handrail from contacting the handrail during folding.

The present invention has been achieved on the basis of the above respects, and an object of the present invention is to provide a construction machine in which a lateral visibility is secured by attaching a mirror to a foldable handrail without interfering with folding of the handrail, and in which the mirror is prevented from becoming an obstacle to transporting the construction machine, an obstacle to a walkway, an obstacle to a cover that is opened/closed at maintenance.

Means for Solving the Problem

To attain the object, the present invention adopts, for example, a configuration set forth in claims.

The present application includes a plurality of means for solving the problem. As an example of the means, there is provided a construction machine including: a machine body; a walkway formed on an upper surface of a lateral one side of the machine body and enabling a worker to walk therein; and a handrail configured to be height-variable by a fixed rail body provided standing along part of the walkway at an end portion on the lateral one side on the upper surface of the machine body and a movable rail body attached rotatably to an upper end portion of the fixed rail body and foldable with respect to the fixed rail body. The fixed rail body has a plurality of struts disposed apart from one another in a direction along the walkway. Each of the plurality of struts has a bent shape such that an upper portion is located more outward in a lateral direction of the machine body than a lower portion. A first mirror is attached to the upper portion of any one of the plurality of struts. The first mirror is disposed more outward in the lateral direction of the machine body than the lower portions of the plurality of struts and within a width of the machine body. The first mirror is disposed between the plurality of struts, below an upper end portion of the fixed rail body, and above a rotation tip portion of the movable rail body after folded.

Effect of the Invention

According to the present invention, disposing the mirror more outward in the lateral direction than the lower portions of the struts of the fixed rail body 50 prevents the mirror from protruding to the walkway. Thus, the mirror does not constitute an obstacle to the walkway. Furthermore, disposing the mirror within the width of the machine body and below the upper end portion of the fixed rail body prevents the mirror from protruding laterally outside of and upward of the machine body. Thus, the mirror does not constitute an obstacle to transporting the construction machine. Moreover, disposing the mirror between the struts disposed along the walkway prevents the mirror from protruding beyond an extension range of the handrail. Thus, even though there is an openable cover at a position adjacent to the handrail, the mirror does not constitute an obstacle to opening and closing of the cover. Further, the mirror is disposed between the upper end portion of the fixed rail body and the rotation tip portion of the movable rail body after folded. Thus, the mirror does not contact the handrail during folding. In other words, attaching the mirror to the foldable handrail to secure a lateral visibility neither result in constituting an obstacle to the walkway, an obstacle to transporting, and an obstacle to the cover opened/closed at maintenance nor result in interfering with folding of the handrail.

BRIEF DESCRIPTION OF THE DRAWINGS

FIG. 6 is a perspective view illustrating a position relationship after folding of the handrail between the handrail and the mirrors which configure the embodiment of the construction machine of the present invention depicted in FIG. 5.

FIG. 7 is an explanatory diagram illustrating positions of the handrail and the mirrors which configure the embodiment of the construction machine of the present invention depicted in FIG. 5.

MODES FOR CARRYING OUT THE INVENTION

A construction machine according to an embodiment of the present invention will be described hereinafter with reference to the drawings. In the present embodiment, a wheel type hydraulic excavator will be described as an example of the construction machine. It is noted that the wheel type hydraulic excavator will be described using directions viewed from an operator seated in a cab seat.

Figure 1:
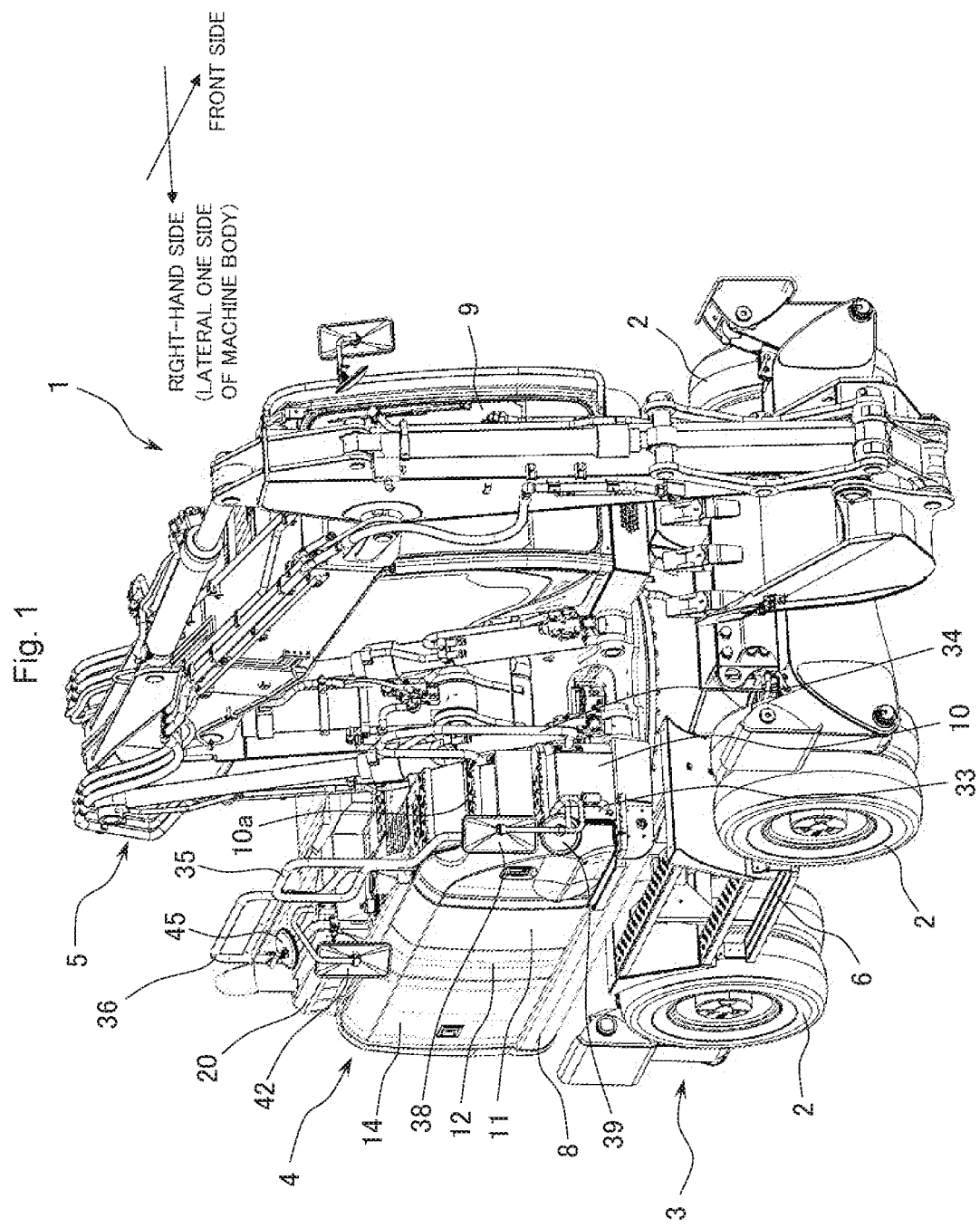
FIG. 1 is a perspective view illustrating a hydraulic excavator to which one embodiment of a construction machine of the present invention is applied.
Figure 2:
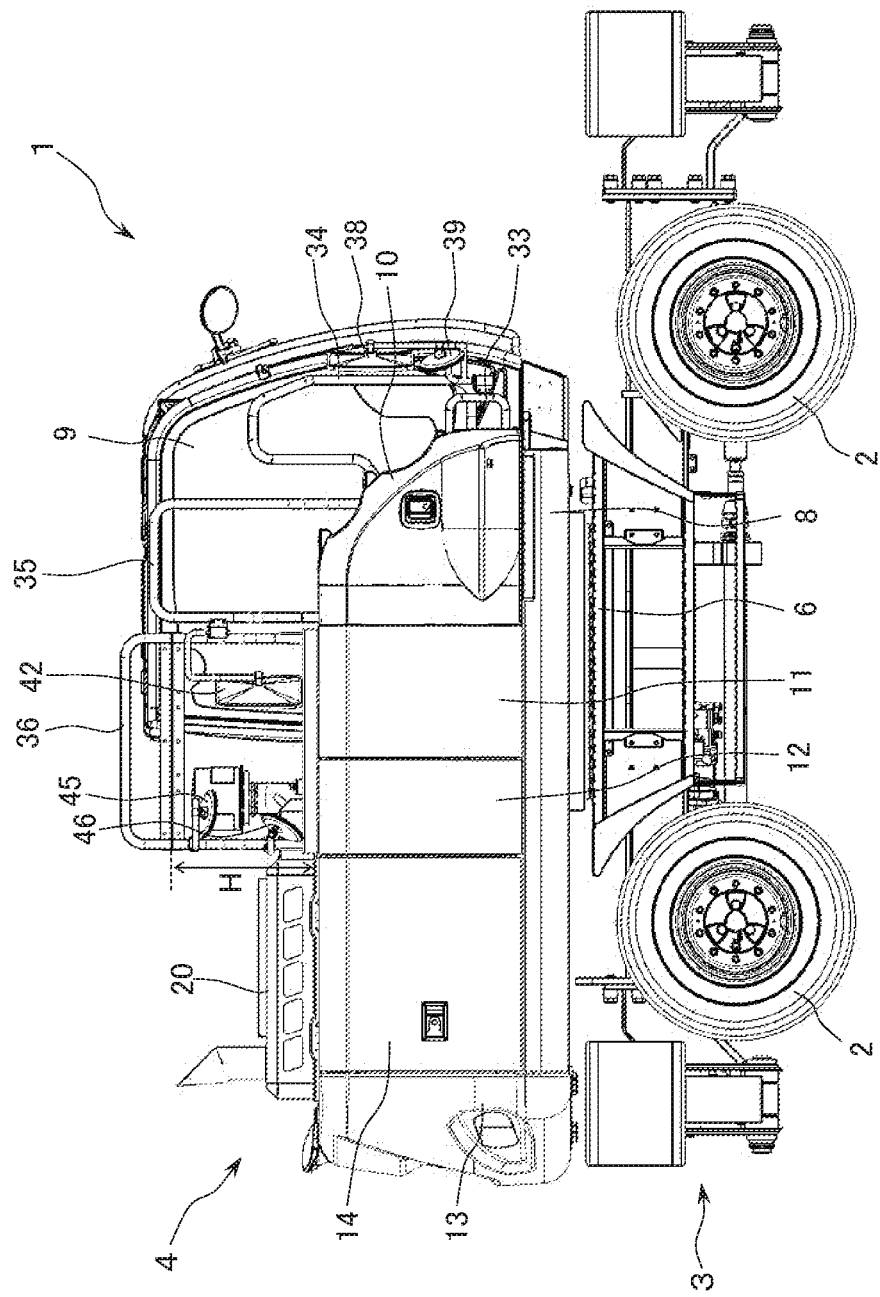
FIG. 2 is a side view illustrating the hydraulic excavator, depicted in FIG. 1, in which a work implement is omitted and to which the embodiment of the construction machine of the present invention is applied.
Figure 3:
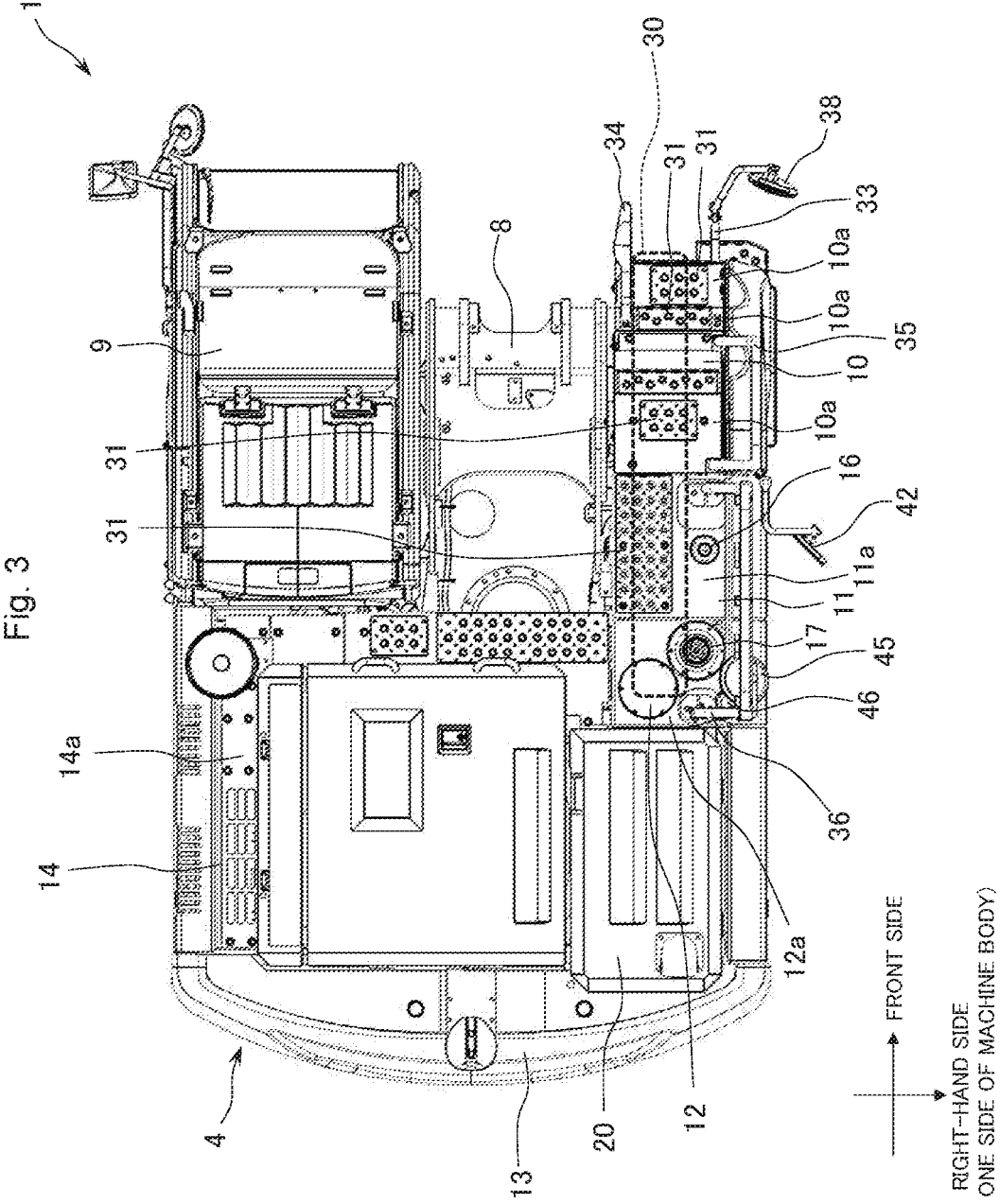
FIG. 3 is a plan view illustrating the hydraulic excavator, depicted in FIG. 1, to which the embodiment of the construction machine of the present invention is applied and in which the work implement is omitted.
Figure 4:
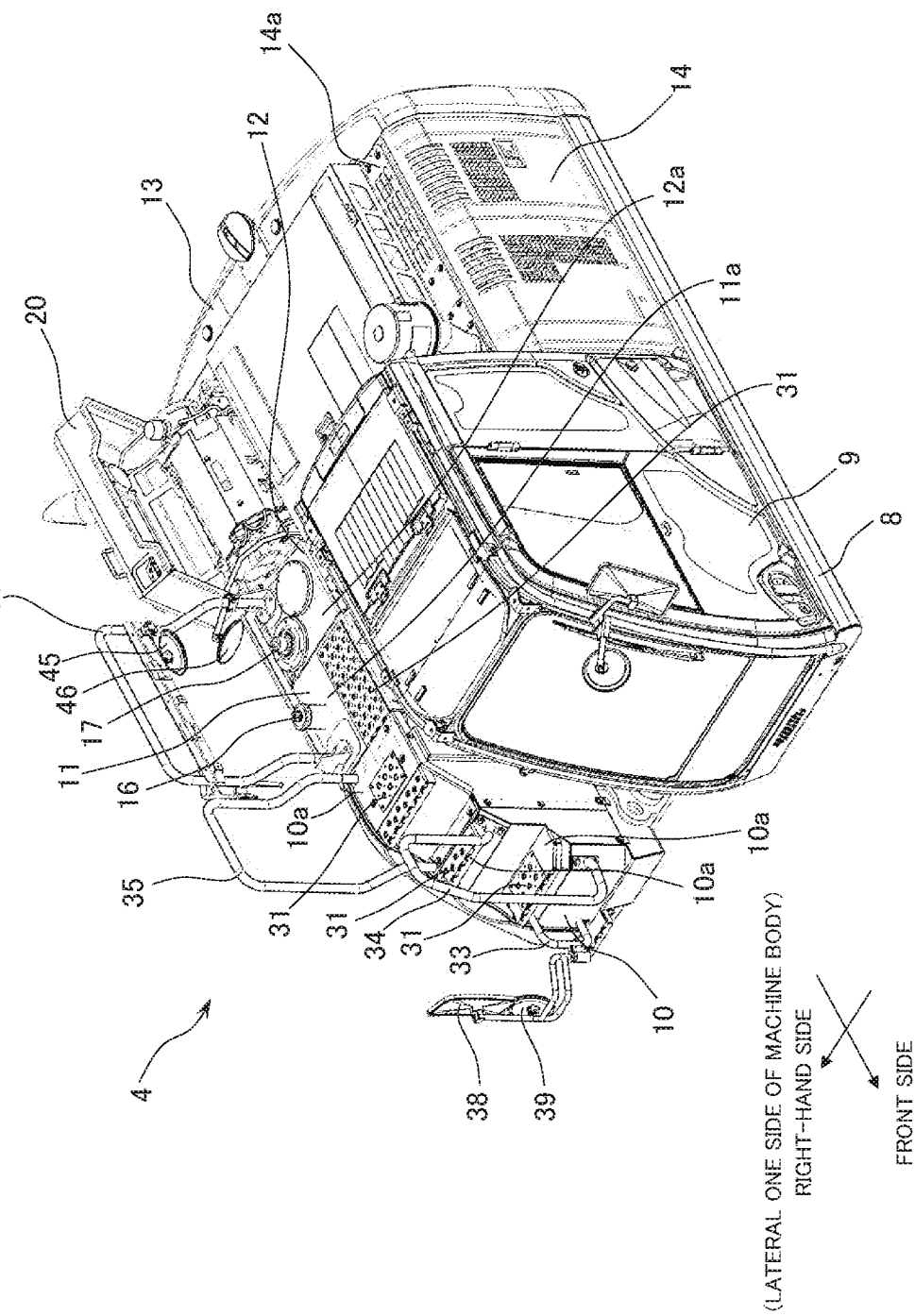
FIG. 4 is a perspective view illustrating an upper swing structure of the hydraulic excavator, depicted in FIG. 3, in which a cover is opened and to which the embodiment of the construction machine of the present invention is applied.

First, a configuration of the hydraulic excavator to which one embodiment of the construction machine of the present invention is applied will be described with reference to FIGS. 1 to 4. FIG. 1 is a perspective view illustrating the hydraulic excavator to which one embodiment of the construction machine of the present invention is applied. FIG. 2 is a side view illustrating the hydraulic excavator, depicted in FIG. 1, in which a work implement is omitted and to which the embodiment of the construction machine of the present invention is applied. FIG. 3 is a plan view illustrating the hydraulic excavator, depicted in FIG. 1, in which the work implement is omitted and to which the embodiment of the construction machine of the present invention is applied. FIG. 4 is a perspective view illustrating an upper swing structure of the hydraulic excavator, depicted in FIG. 3, in which a cover is opened and to which the embodiment of the construction machine of the present invention is applied.

In FIG. 1, a wheel type hydraulic excavator 1 includes, as a machine body, a lower travel structure 3 having a plurality of wheels 2 and an upper swing structure 4 swingably mounted on the lower travel structure 3. A work implement 5 for excavating earth and sand is provided at a central portion, in a width direction, of a front portion of the upper swing structure 4 in an elevatable fashion. A stair 6 for getting onto and off is installed between the front and rear wheels 2 on a right-hand side of the lower travel structure 3.

As illustrated in FIGS. 1 to 3, the upper swing structure 4 is generally configured with a swing frame 8 swingably mounted on the lower travel structure 3, a cab 9 arranged on a left-hand side (lateral other side of the machine body) on a front portion of the swing frame 8, an accommodation case 10 arranged on a right-hand side (lateral one side of the machine body) at a front end portion of the swing frame 8, that is, on an opposite side to the cab 9 across the work implement 5, a fuel tank 11 arranged rearward of the accommodation case 10 on the right-hand side of the swing frame 8, a hydraulic fluid tank 12 arranged rearward of the fuel tank 11 on the right-hand side of the swing frame 8, a counterweight 13 arranged at a rear end portion of the swing frame 8, and a machine room 14 arranged between the counterweight 13 and the cab 9 or the hydraulic fluid tank 12.

The cab 9 is an element on which an operator gets, and a cab seat (not depicted) in which the operator is seated is installed within the cab 9. The accommodation case 10 accommodates devices or tools (not depicted) such as control valves and a reductant tank that stores a reductant for an exhaust gas treatment. The accommodation case 10 is configured to have a stepped shape with a plurality of steps in a longitudinal direction. The fuel tank 11 is a pressure-resistant tank with a generally rectangular prism-like shape extending in a vertical direction. A supply port 16 for supplying a fuel is provided in an upper surface 11a of the fuel tank 11. The hydraulic fluid tank 12 is a pressure-resistant tank with a generally rectangular prism-like shape extending in the vertical direction. A supply port 17 for supplying a hydraulic fluid is provided in an upper surface 12a of the hydraulic fluid tank 12. The counterweight 13 is provided so that the entire upper swing structure 4 counterbalances the work implement 5. The machine room 14 stores therein devices such as an engine (not depicted) and a hydraulic pump (not depicted). As illustrated in FIG. 4, an openable cover 20 is provided in a right-hand side portion of an upper surface 14a of the machine room 14, that is, in a portion located rearward of the hydraulic fluid tank 12 on the upper surface 14a of the machine room 14. At maintenance, opening the cover 20 by rotating the cover 20 about a longitudinal direction as an axis enables the worker to access the devices such as the engine and the hydraulic pump.

As illustrated in FIG. 3, on a right-hand side of an upper surface of the upper swing structure 4, a space where the worker can walk is secured as a walkway 30 for the worker to conduct various maintenance work such as replenishment of the fuel and the hydraulic fluid and adjustment of the various devices such as the engine and the hydraulic pump. Specifically, the walkway 30 is formed on stepped upper surfaces 10a of the accommodation case 10, and on the upper surfaces 11a and 12a of the fuel tank 11 and the hydraulic fluid tank 12 disposed rearward of the accommodation case 10 in sequence. As illustrated in FIGS. 3 and 4, non-slip members 31 are provided on the upper surfaces 10a of the accommodation case 10 and the upper surface 11a of the fuel tank 11 that serve as a floor surface of the walkway 30 to prevent the worker from slipping while walking in the walkway 30.

As illustrated in FIGS. 1 to 4, four handrails, which are a first handrail 33, a second handrail 34, a third handrail 35, and a fourth handrail 36, are installed on the right-hand side of the upper swing structure 4 along the walkway 30. The first handrail 33 is installed at a right end portion of a forefront portion of the accommodation case 10, that is, on a laterally outward side of an entrance portion of the walkway 30. The first handrail 33 is used to move up and down the walkway 30. The second handrail 34 is installed at a left end portion of a front side of the accommodation case 10, that is, along on a laterally inward side of first half of a stepped portion of the walkway 30. The second handrail 34 is used together with the first handrail 33 to move up and down the walkway 30. The third handrail 35 is installed at a right end portion of a rear side of the accommodation case 10, that is, along on a laterally outward side of second half of the stepped portion of the walkway 30. The third handrail 35 is used together with the second handrail 34 to move up and down the walkway 30. The fourth handrail 36 is installed at right end portions (lateral one side end portions) of the fuel tank 11 and the hydraulic fluid tank 12, that is, along on a laterally outward side of the walkway 30 extending in the longitudinal direction in such a manner as to extend rearward of the third handrail 35. The fourth handrail 36 is used to assist the worker in walking. A height of the fourth handrail 36 is set to be equal to or larger than a predetermined value from an installation surface (upper surfaces 11a and 12a of the fuel tank 11 and the hydraulic fluid tank 12) so that the fourth handrail 36 can function as a safety fence for preventing the worker from falling from the walkway 30. An upper end portion of the fourth handrail 36 is in a state of being located above an upper surface of the cab 9 as illustrated in FIG. 2. Hence, the fourth handrail 36 is configured to be foldable and height-variable, as will be described later in detail, to prevent the fourth handrail 36 from constituting an obstacle to transporting the hydraulic excavator 1 by a truck or the like.

As illustrated in FIGS. 1 to 4, a first mirror 38 and a second mirror 39 are attached to the first handrail 33 in a horizontally rotatable manner for checking a right-hand side and a right front side of the machine body. The first and second mirrors 38 and 39 are disposed at positions such that a sight line from the operator seated in the cab seat (not depicted) can be secured when the work implement 5 is at a raising position. The first and second mirrors 38 and 39 are rotated to positions at which the first and second mirrors 38 and 39 do not protrude forward of the upper swing structure 4 when the hydraulic excavator 1 is transported. A third mirror 42 is rotatably attached to the third handrail 35 for checking a rear side of the upper surface of the upper swing structure 4. The third mirror 42 is rotated to a position at which the third mirror 42 does not protrude laterally outside of the upper swing structure 4 at transporting. A fourth mirror (side view mirror) 45 and a fifth mirror (side front view mirror) 46 are attached to the fourth handrail 36 for checking a right side and a right front side of the machine body. The fourth and fifth mirrors 45 and 46 are disposed at positions such that a sight line from the operator seated in the cab seat can be secured when the work implement 5 is at a lowering position.

A structure of the fourth handrail configuring part of the construction machine according to the embodiment of the present invention will next be described with reference to FIGS. 5 to 7.

Figure 5:
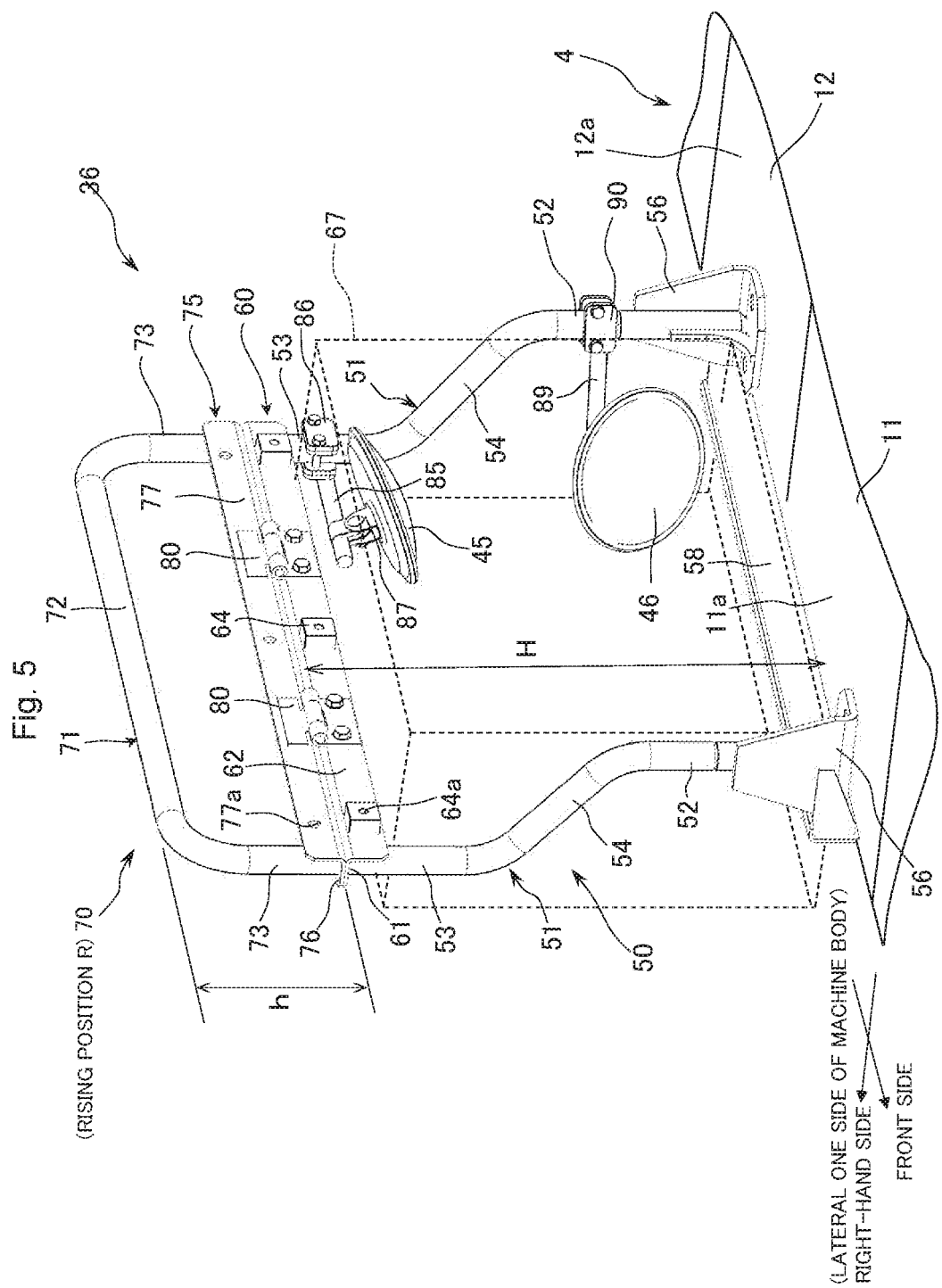
FIG. 5 is a perspective view illustrating a handrail and mirrors attached to the handrail which configure the embodiment of the construction machine of the present invention depicted in FIG. 4.

FIG. 5 is a perspective view illustrating a handrail and mirrors attached to the handrail which configure the embodiment of the construction machine of the present invention depicted in FIG. 4. FIG. 6 is a perspective view illustrating a position relationship after folding of the handrail between the handrail and the mirrors which configure the embodiment of the construction machine of the present invention depicted in FIG. 5. FIG. 7 is an explanatory diagram illustrating positions of the handrail and the mirrors which configure the embodiment of the construction machine of the present invention depicted in FIG. 5. In FIG. 7, movable rail bodies 70 denoted by chain double-dashed lines indicate the movable rail body 70 at a rising position R and at a position C of a laterally innermost side. An arrow denoted by a chain double-dashed line indicates a rotational trajectory T of a horizontal section 72 of the movable rail body 70. It is noted that elements in FIGS. 5 to 7 denoted by the same reference characters as those illustrated in FIGS. 1 to 4 are the same and detailed description thereof will be omitted.

In FIGS. 5 and 6, the fourth handrail 36 has a fixed rail body 50 provided standing along part of the walkway 30 (refer to FIG. 3) at an end portion on a right-hand side on the upper surface of the upper swing structure 4, and the movable rail body 70 attached rotatably to upper end portions of the fixed rail body 50. The fourth handrail 36 is configured such that the movable rail body 70 is foldable with respect to the fixed rail body 50. In other words, the movable rail body 70 is rotatable with respect to the fixed rail body 50 between the rising position R illustrated in FIG. 5 and a folding position F illustrated in FIG. 6. Thus, the fourth handrail 36 is configured to be height-variable. The fixed rail body 50 is configured, for example, with two struts 51 that are provided standing on the fuel tank 11 and the hydraulic fluid tank 12 of the upper swing structure 4 and that are disposed apart from each other in the longitudinal direction (direction along the walkway 30), and a rotation supporting member 60 provided to spread over the two struts 51. A height H of the fixed rail body 50 is set such that upper end of the fixed rail body 50 is lower than the upper surface of the cab 9 (refer to FIG. 2).

Each strut 51 is configured with, for example, a pipe member and has a bent shape such that an upper portion is located on the right hand side of the upper swing structure 4 relative to (more outward in a lateral direction of the machine body than) a lower portion. In other words, each strut 51 is configured with a lower strut section 52 that extends in the vertical direction, an upper strut section 53 that is located on an upper right side of the lower strut section 52 and that extends in the vertical direction, and an intermediate strut section 54 that joins the lower strut section 52 and the upper strut section 53 together and that extends diagonally upward right from an upper end of the lower strut section 52 to a lower end of the upper strut section 53. The lower strut section 52 of each strut 51 is fixed to the upper surface 11a or 12a of the fuel tank 11 or the hydraulic fluid tank 12 via a bracket 56. A foot guard 58 is installed between the lower strut sections 52 for preventing the walking worker from falling from the upper swing structure 4.

The rotation supporting member 60 of the fixed rail body 50 is a member extending in the longitudinal direction (direction along the walkway 30) and having an L-cross-section. The rotation supporting member 60 is configured with a first face section 61 fixed to upper ends of the upper strut sections 53 of struts 51 and a second face section 62 protruding downward from a left end of the first face section 61. As illustrated in FIG. 6, a plurality of bolt insertion holes 61a (for example, three in FIG. 6) penetrating in the vertical direction are provided in the first face section 61 to be apart from one another in the longitudinal direction. Nuts (not depicted) are fixed by welding or the like to positions of the bolt insertion holes 61a on a lower surface of the first face section 61. As illustrated in FIG. 5, a plurality of (for example, three in FIG. 5) movable rail body fixing members 64 with a threaded hole 64a are provided on a left-hand side face of the second face section 62 of the rotation supporting member 60 to be apart from one another in the longitudinal direction.

As illustrated in FIGS. 5 and 7, a region that surrounds a range from the upper surface of the upper swing structure 4 to the rotation supporting member 60 of the fixed rail body 50 in a height direction and a range from the lower strut sections 52 of the struts 51 to a position O of a laterally outermost end of the upper swing structure 4 in a width direction of the machine body between the two struts 51 of the fixed rail body 50 is defined as an accommodation space 67 for accommodating the fourth mirror 45 and the fifth mirror 46.

As illustrated in FIGS. 5 and 6, the movable rail body 70 is configured with a rail main body 71 for the worker to grip during walking and a rotational axis member 75 that is fixed to the rail main body 71 and that serves as a rotation center. The rail main body 71 is configured with a pipe member and formed into a U-shape, for example. In other words, the rail main body 71 is configured with the horizontal section 72 that extends in the horizontal direction and that serves as a rotation tip portion and two upright sections 73 that extend in a perpendicular direction from two end portions of the horizontal section 72, respectively. A width between the two upright sections 73 is set generally identical to a width between the upper strut sections 53 of the two struts 51. The rotational axis member 75 is a member extending in the longitudinal direction (direction along the walkway 30) and having an L-cross-section. The rotational axis member 75 is configured with a first face section 76 fixed to tip portions of the two upright sections 73 (portions on an opposite side to the horizontal section 72) and a second face section 77 protruding from an end portion of the first face section 76 toward the horizontal section 72.

As illustrated in FIG. 6, a plurality of first bolt insertion holes 76a are provided in the first face section 76 of the rotational axis member 75. The first bolt insertion holes 76a are formed at positions at which the first bolt insertion holes 76a overlap the bolt insertion holes 61a of the rotation supporting member 60 of the fixed rail body 50 when the movable rail body 70 is at the rising position R (refer to FIG. 5). As illustrated in FIG. 5, a plurality of second bolt insertion holes 77a are provided in the second face section 77 of the rotational axis member 75. The second bolt insertion holes 77a are formed at positions at which the second bolt insertion holes 77a overlap the threaded holes 64a of the movable rail body fixing members 64 when the movable rail body 70 is at the folding position F (refer to FIG. 6).

In a state in which the first face section 76 of the rotational axis member 75 of the movable rail body 70 is disposed on the first face section 61 of the rotation supporting member 60 of the fixed rail body 50 and in which the second face section 62 of the rotation supporting member 60 and the second face section 77 of the rotational axis member 75 are disposed on a generally identical vertical plane, the second face section 62 of the rotation supporting member 60 and the second face section 77 of the rotational axis member 75 are coupled to each other by a plurality of (two in FIGS. 5 and 6) hinges 80. As illustrated in FIG. 7, the movable rail body 70 can be thereby rotated inward in the lateral direction of the upper swing structure 4 by approximately 180° with respect to the fixed rail body 50 and moved from the rising position R to the folding position F. As illustrated in FIG. 5, at the rising position R, each upright section 73 of the rail main body 71 runs in line with each upper strut section 53 of the fixed rail body 50 with the upright section 73 upon the upper strut section 53. As illustrated in FIG. 6, at the folding position F, each upright section 73 laterally overlaps each upper strut section 53. As illustrated in FIG. 7, bent shapes of the struts 51 and a height h of the movable rail body 70 in the fourth handrail 36 are set so that the position C of the laterally innermost side during rotation of the horizontal section 72 of the movable rail body 70 (position at rotation from the rising position R or the folding position F by approximately 90°) is more outward in the lateral direction than the walkway 30, that is, in such a manner that the movable rail body 70 passes more outward in the lateral direction than the walkway 30 during rotation.

When the movable rail body 70 is rotated to the rising position R, bolts (not depicted) are inserted from above into the first bolt insertion holes 76a of the rotational axis member 75 of the movable rail body 70 and the bolt insertion holes 61a of the rotation supporting member 60 of the fixed rail body 50 and screwed and fastened to nuts (not depicted) on the lower side of the first face section 61 of the rotation supporting member 60 as illustrated in FIGS. 5 and 6, thereby fixing the movable rail body 70 to the fixed rail body 50 at the rising position R. On the other hand, when the movable rail body 70 is rotated to the folding position F, the bolts 81 are inserted into the second bolt insertion holes 77a of the rotational axis member 75 of the movable rail body 70 and screwed and fastened to the threaded holes 64a of the movable rail body fixing member 64, thereby fixing the movable rail body 70 to the fixed rail body 50 at the folding position F.

A disposition relationship of the mirrors, configuring part of the embodiment of the construction machine of the present invention, with relative to the handrail will next be described with reference to FIGS. 5 to 7.

As illustrated in FIG. 5, the fourth mirror 45 is attached to the upper strut section 53 of the rear-side strut 51 of the fourth handrail 36 via a stay 85. The fifth mirror 46 is attached to the lower strut section 52 of the rear-side strut 51 via a stay 89. The stays 85 and 89 are, for example, straight line members. A first clamp 86 and a first clamp 90 are attached to end portions of the stays 85 and 89 on one side, respectively. A second clamp 87 and a second clamp (not depicted) are attached to end portions thereof on the other side, respectively. The first clamp 86 and the first clamp 90 clamp the strut 51, thereby fixing the stays 85 and 89 to the strut 51. The first clamp 86 and the first clamp 90 are each movable in the longitudinal direction of the strut 51 and rotatable about the strut 51 as an axis. The second clamp 87 and the second clamp (not depicted) attach the fourth mirror 45 and the fifth mirror 46 to the stays 85 and 89, respectively. The second clamp 87 and the second clamp (not depicted) are movable in the longitudinal direction of the stays 85 and 89 and rotatable about the stays 85 and 89 as axes, respectively. The fourth mirror 45 and the fifth mirror 46 are attached to the second clamp 87 and the second clamp (not depicted) to be rotatable about a direction orthogonal to the longitudinal direction of the stays 85 and 89 as axes.

Dispositions and visibility ranges of the fourth mirror 45 and the fifth mirror 46 are adjusted as follows. First, the stays 85 and 89 are moved along the strut 51 and rotated about the strut 51 as the axis. Second, the fourth mirror 45 and the fifth mirror 46 are moved along the stays 85 and 89 and rotated about the stays 85 and 89 as the axes, respectively. Third, the fourth mirror 45 and the fifth mirror 46 are rotated relative to the second clamp 87 and the second clamp (not depicted), respectively. For example, the stay 85 supporting the fourth mirror 45 is disposed laterally outer side of the upper strut section 53 and along the rotation supporting member 60. The stay 89 supporting the fifth mirror 46 is disposed to protrude outward in the lateral direction and slightly forward from the lower strut section 52.

As illustrated in FIGS. 5 and 7, the fourth mirror 45 is accommodated in the accommodation space 67. Specifically, as illustrated in FIG. 7, the fourth mirror 45 is disposed on the right-hand side of (more outward in the lateral direction of the machine body than) the lower strut sections 52 (lower portion of the strut 51) and on the left-hand side of (more inward in the lateral direction of the machine body than) the position O of the laterally outermost end of the upper swing structure 4, that is, within a width of the upper swing structure 4. Moreover, as illustrated in FIGS. 6 and 7, the fourth mirror 45 is disposed between the two struts 51, below the rotation supporting member 60 (upper end portion) of the fixed rail body 50, and above the horizontal section 72 (rotation tip portion) of the movable rail body 70 after folded, more specifically, closer to the rotational axis member 75 (rotation center) of the movable rail body 70 than the rotational trajectory T of the horizontal section 72 of the movable rail body 70. The fourth mirror 45 is disposed, for example, such that a mirrored surface faces generally downward and is adjusted such that the seated operator can see the entire lateral side.

As illustrated in FIGS. 5 and 7, the fifth mirror 46 is accommodated in the accommodation space 67. Specifically, as illustrated in FIG. 7, the fifth mirror 46 is disposed on the right-hand side of the lower strut section 52 and on the left-hand side of the position O of the laterally outermost end of the upper swing structure 4, that is, within the width of the upper swing structure 4, like the fourth mirror 45. Furthermore, as illustrated in FIG. 6, the fifth mirror 46 is disposed between the two struts 51 and below the horizontal section 72 of the movable rail body 70 after folded, for example, generally right under the fourth mirror 45. For example, the fifth mirror 46 is disposed such that a mirrored surface faces diagonally forward left and is adjusted such that the seated operator can see a side front.

Work during maintenance and during transport in the embodiment of the construction machine of the present invention will next be described with reference to FIGS. 1 to 7.

At a time of conducting various maintenance work such as replenishment of the fuel and the hydraulic fluid and adjustment of various devices in the hydraulic excavator 1 configured described above, it is necessary for the worker to climb up onto an upper surface of an high position of the upper swing structure 4 depicted in FIG. 1 and conduct the work. For example, the worker for the maintenance work of the devices in the machine room 14 first moves up the lower travel structure 3 using the stair 6 on the right-hand side of the lower travel structure 3. Subsequently, the worker grips the first and second handrails 33 and 34 and then grips the second and third handrails 34 and 35, thereby climbing up on multiple upper surfaces 10*a* of the stepped accommodation case 10. After finishing climbing up on the accommodation case 10, the worker walks on the fuel tank 11 and the hydraulic fluid tank 12 along the walkway 30 while gripping the fourth handrail 36 illustrated in FIG. 3.

In the present embodiment, the fourth mirror 45 and the fifth mirror 46 are disposed on the right-hand side of the lower strut sections 52 of the struts 51 of the fourth handrail 36 as illustrated in FIGS. 3 and 7. Thus, the fourth mirror 45 and the fifth mirror 46 do not protrude to the walkway 30 along the fourth handrail 36. Therefore, the fourth mirror 45 and the fifth mirror 46 do not constitute an obstacle to the worker walking in the walkway 30 while gripping the fourth handrail 36.

Furthermore, even in a case in which the worker gets out of balance or slips when walking on the fuel tank 11 and on the hydraulic fluid tank 12, the fourth handrail 36 with the height equal to or larger than the predetermined value and the foot guard 58 can prevent the walking worker from falling from the upper swing structure 4.

Subsequently, the worker arriving at the machine room 14 rotates the cover 20 in a rightward direction of the upper swing structure 4 to open the cover 20 as illustrated in FIG. 4. In the present embodiment, the fourth mirror 45 and the fifth mirror 46 are disposed between the two struts 51 disposed apart from each other in the longitudinal direction as illustrated in FIGS. 4 and 5. Thus, the fourth mirror 45 and the fifth mirror 46 do not protrude beyond an extension range of the fourth handrail 36. Therefore, the fourth mirror 45 and the fifth mirror 46 do not constitute an obstacle to opening/closing of the cover 20 located rearward of the fourth handrail 36.

Meanwhile, in the hydraulic excavator 1 having the configuration described above, the upper end portion of the fourth handrail 36 is located at a higher position than the upper surface of the cab 9 as illustrated in FIG. 2. Thus, it is necessary to fold the fourth handrail 36 at a time of transport. Specifically, as illustrated in FIGS. 5 to 7, the movable rail body 70 of the fourth handrail 36 is rotated relative to the fixed rail body 50 from the rising position R inward in the lateral direction of the upper swing structure 4 and folded at the folding position F. The height of the fourth handrail 36 after folded thereby becomes equal to the height H of the fixed rail body 50 and the upper end of the fourth handrail 36 after folded becomes lower than the upper surface of the cab 9. In this way, the fourth handrail 36 is configured to be height-variable and, therefore, does not constitute an obstacle to transporting.

In the present embodiment, the fourth mirror 45 is disposed within the width of the upper swing structure 4 and disposed below the rotation supporting member 60 of the fixed rail body 50 as illustrated in FIGS. 3 and 7. Thus, the fourth mirror 45 does not protrude laterally outside of the upper swing structure (machine body) 4 and upward of the cab (machine body) 9. Therefore, the fourth mirror 45 does not constitute an obstacle during transport. Furthermore, the fourth mirror 45 is disposed between the rotation supporting member 60 of the fixed rail body 50 and the horizontal section 72 of the movable rail body 70 after folded as illustrated in FIGS. 6 and 7. Thus, the movable rail body 70 does not contact the fourth mirror 45 when rotating.

Moreover, the fifth mirror 46 is disposed within the width of the upper swing structure 4 and disposed below the horizontal section 72 of the movable rail body 70 after folded as illustrated in FIGS. 3 and 7. Thus, the fifth mirror 46 does not protrude laterally outside of the upper swing structure 4 and upward of the cab 9. Therefore, the fifth mirror 46 does not constitute an obstacle during transport. Further, the fifth mirror 46 is disposed below the horizontal section 72 of the movable rail body 70 after folded as illustrated in FIGS. 6 and 7, and thus, the movable rail body 70 does not contact the fifth mirror 46 when rotating.

Furthermore, in the present embodiment, the fourth mirror 45 and the fifth mirror 46 are attached not to the movable rail body 70 but to the strut 51 of the fixed rail body 50. Thus, positions of the fourth mirror 45 and the fifth mirror 46 do not change before and after folding of the movable rail body 70. Therefore, even if the movable rail body 70 fails to rise after transporting of the hydraulic excavator 1, it is possible to reliably check a right-hand side of the hydraulic excavator 1.

As described above, according to the embodiment of the construction machine of the present invention, the fourth mirror 45 is disposed more outward in the lateral direction than the lower portions of the struts 51 of the fixed rail body 50. Thus, the fourth mirror 45 does not constitute an obstacle to the walkway 30. Furthermore, the fourth mirror 45 is disposed within the width of the upper swing structure (machine body) 4 and below the rotation supporting member (upper end portion) 60 of the fixed rail body 50. Thus, the fourth mirror 45 does not constitute an obstacle to transporting the construction machine. Moreover, the fourth mirror 45 is disposed between the struts 51 disposed along the walkway 30. Thus, even though the openable cover 20 is at a position adjacent to the fourth handrail 36, the fourth mirror 45 does not constitute an obstacle to opening/closing of the cover 20. Further, the fourth mirror 45 is disposed between the rotation supporting member (upper end portion) 60 of the fixed rail body 50 and the horizontal section (rotation tip portion) 72 of the movable rail body 70 after folded. Thus, the fourth mirror 45 does not contact the fourth handrail 36 during folding. In other words, attaching the fourth mirror 45 to the foldable fourth handrail 36 to secure the lateral visibility neither result in constituting an obstacle to the walkway 30, an obstacle to transporting, and an obstacle to the cover 20 opened/closed at a time of maintenance nor result in interfering with folding of the fourth handrail 36.

Furthermore, according to the present embodiment, the two mirrors, which are the fourth mirror 45 for checking the lateral side and the fifth mirror 46 for checking the side front, can be installed in such a manner that the mirrors do not constitute an obstacle to the walkway 30, an obstacle to transporting, and an obstacle to the cover that is opened/closed at a time of maintenance and interfere with folding of the handrail. Thus, it is possible to secure a favorable lateral visibility in a wider range.

Moreover, according to the present embodiment, the fourth mirror 45 for checking the lateral side is disposed above the fifth mirror 46 for checking the side front. Thus, it is possible to obtain a wider visibility of the fourth mirror 45 and to secure a more favorable lateral visibility, compared with a case of disposing the fourth mirror 45 on the lower side.

Further, according to the present embodiment, one of the two struts 51 of the fixed rail body 50 is fixed to the fuel tank 11 and the other strut 51 is fixed to the hydraulic fluid tank 12. Thus, the fuel tank 11 and the hydraulic fluid tank 12 are in a coupled state and it is possible to enhance rigidities of the fuel tank 11 and the hydraulic fluid tank 12. Furthermore, since the two struts 51 are fixed to the different tanks without installing both of the struts 51 on one tank, it is possible to reliably secure an installation space for the struts 51.

In addition, according to the present embodiment, the bent shape of each strut 51 and the height h of the movable rail body 70 are set in such a manner that the movable rail body 70 passes more outward in the lateral direction than the walkway 30 during rotation. Thus, even in a case of falsely rotating the movable rail body 70 at the rising position R for some reasons, it is possible to suppress collision of the movable rail body 70 against the worker during work or during walking.

While an example of applying the construction machine of the present invention to the wheel type hydraulic excavator 1 has been illustrated in one embodiment described above, the present invention is widely applicable to various construction machines such as a crawler type hydraulic excavator, a hydraulic crane, and a wheel loader equipped with a foldable handrail.

Furthermore, the present invention is not limited to the present embodiment but encompasses various modifications. The above embodiment has been described in detail for describing the present invention so that the present invention is easy to understand, and the present invention is not always limited to the embodiment having all the described configurations.

For example, in the embodiment described above, an example of arranging the cab 9 on the left-hand side and the fuel tank 11 and the hydraulic fluid tank 12 on the right-hand side has been illustrated. Alternatively, it is possible to adopt a configuration of left-right reversal of dispositions of the fuel tank 11 and the hydraulic fluid tank 12 and that of the cab 9. In this case, the configuration is such that the fourth handrail 36, the fourth mirror 45, the fifth mirror 46, and the like are also located in a left-right reversal fashion.

Moreover, in the embodiment described above, an example of providing the fourth handrail 36 standing on the fuel tank 11 and the hydraulic fluid tank 12 has been illustrated. However, the fourth handrail 36 can be disposed along the walkway formed on the upper surfaces of various parts of the machine body and is not necessarily installed on the fuel tank 11 and the hydraulic fluid tank 12.

In the embodiment described above, an example of disposing the fourth mirror 45 for checking the entire lateral side on the upper strut section 53 of the fixed rail body 50 and disposing the fifth mirror 46 for checking the lateral side front on the lower strut section 52 has been illustrated. Alternatively, the fourth mirror 45 and the fifth mirror 46 can be disposed in a reversal fashion. It is noted, however, that disposing the fourth mirror 45 on the upper side makes it possible to obtain wider lateral visibility and to secure more favorable lateral visibility.

While an example of configuring the fixed rail body 50 with the two struts 51 has been illustrated in the embodiment described above, the fixed rail body can be configured to have three or more struts 51 disposed apart from one another and along the walkway 30.

Furthermore, in the embodiment described above, an example of configuring the fourth handrail 36 to be foldable by attaching the hinges 80 to the rotation supporting member 60 of the fixed rail body 50 and to the rotational axis member 75 of the movable rail body 70 has been illustrated. Alternatively, the fourth handrail 36 can be configured to be foldable not by including the rotation supporting member 60 and the rotational axis member 75 but by pin-connecting upper end portions of the struts 51 of the fixed rail body 50 to end portions of the upright sections 73 of the movable rail body 70.

In the embodiment described above, an example of fixing the fourth mirror 45 to the upper strut section 53 of the strut 51 via the stay 85 and fixing the fifth mirror 46 to the lower strut section 52 of the strut 51 via the stay 89 has been illustrated. Alternatively, the fourth mirror 45 and the fifth mirror 46 can be fixed to any one of the upper strut section 53 and the lower strut section 52 of the strut 51. In this case, using bent stays makes it possible to maintain the arrangements of the fourth mirror 45 and the fifth mirror 46 while changing portions of the strut 51 that support the fourth mirror 45 and the fifth mirror 46.

DESCRIPTION OF REFERENCE CHARACTERS

1: Hydraulic excavator (construction machine)
3: Lower travel structure (machine body)

4: Upper swing structure (machine body)
11: Fuel tank
12: Hydraulic fluid tank
30: Walkway
36: Fourth handrail (handrail)
45: Fourth mirror (side view mirror)
46: Fifth mirror (side front view mirror)
50: Fixed rail body
51: Strut
52: Lower strut section
53: Upper strut section
60: Rotation supporting member (upper end portion)
70: Movable rail body
72: Horizontal section (rotation tip portion)

The invention claimed is:

1. A construction machine comprising:
a machine body;
a walkway formed on an upper surface of a lateral one side of the machine body, the walkway enabling a worker to walk therein; and
a handrail configured to be height-variable by a fixed rail body provided standing along part of the walkway at an end portion on the lateral one side on the upper surface of the machine body and a movable rail body attached rotatably to an upper end portion of the fixed rail body and foldable with respect to the fixed rail body, characterized in that
the fixed rail body has a plurality of struts disposed apart from one another in a direction along the walkway, each of the plurality of struts having a bent shape such that an upper portion is located more outward in a lateral direction of the machine body than a lower portion, and
a first mirror is attached to the upper portion of any one of the plurality of struts, the first mirror being disposed more outward in the lateral direction of the machine body than the lower portions of the plurality of struts and within a width of the machine body, the first mirror being disposed between the plurality of struts, below an upper end portion of the fixed rail body, and above a rotation tip portion of the movable rail body after folded.

2. The construction machine according to claim 1, further comprising a second mirror attached to the fixed rail body of the handrail, the second mirror being disposed more outward in the lateral direction of the machine body than the lower portions of the plurality of struts and within the width of the machine body, the second mirror being disposed between the plurality of struts and below the rotation tip portion of the movable rail body after folded.

3. The construction machine according to claim 2, wherein
the first mirror is a side view mirror for checking the lateral one side of the machine body, and
the second mirror is a side front view mirror for checking a front side of the lateral one side of the machine body.

4. The construction machine according to claim 1, wherein
the machine body has a fuel tank and a hydraulic fluid tank that are provided on the lateral one side, the walkway being formed on upper surfaces of the fuel tank and the hydraulic fluid tank, and
the plurality of struts of the fixed rail body are configured with two struts, one of the two struts being fixed to the fuel tank, the other of the two struts being fixed to the hydraulic fluid tank.

5. The construction machine according to claim 1, wherein
the bent shape of each of the plurality of struts and a height of the movable rail body are set in such a manner that the movable rail body passes more outward in the lateral direction than the walkway during rotation.

* * * * *